United States Patent
Hendrickx (10) Patent No.: US 10,846,410 B2
(45) Date of Patent: Nov. 24, 2020

(54) AUTOMATED FUZZING BASED ON ANALYSIS OF APPLICATION EXECUTION FLOW

(71) Applicant: Microsoft Technology Licensing, LLC, Redmond, WA (US)

(72) Inventor: Michael Hendrickx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 15/850,025

(22) Filed: Dec. 21, 2017

(65) Prior Publication Data

US 2019/0197243 A1 Jun. 27, 2019

(51) Int. Cl.
| | | |
|---|---|---|
| *G06F 21/00* | (2013.01) | |
| *G06F 21/57* | (2013.01) | |
| *G06F 21/52* | (2013.01) | |
| *G06F 16/14* | (2019.01) | |
| *G06F 21/12* | (2013.01) | |
| *G06F 21/14* | (2013.01) | |

(52) U.S. Cl.
CPC .......... *G06F 21/577* (2013.01); *G06F 16/148* (2019.01); *G06F 21/128* (2013.01); *G06F 21/14* (2013.01); *G06F 21/52* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 6,535,227 | B1* | 3/2003 | Fox | H04L 41/20 709/223 |
| 9,507,943 | B1* | 11/2016 | Allen | G06F 21/577 |
| 2009/0327943 | A1* | 12/2009 | Medvedev | G06F 21/577 715/772 |
| 2011/0302455 | A1* | 12/2011 | Thomas | G06F 11/3636 714/45 |

(Continued)

OTHER PUBLICATIONS

"International Search Report and Written Opinion Issued in PCT Application No. PCT/US2018/063503", dated Feb. 13, 2019, 10 Pages.

(Continued)

*Primary Examiner* — Shin-Hon (Eric) Chen
(74) *Attorney, Agent, or Firm* — Rainier Patents, P.S.

(57) ABSTRACT

Described herein is a system and method for identifying a vulnerability of an application (e.g., web application). A message comprising a request and associated execution flow of the application in response to the request is received. The message is analyzed to determine whether the execution flow includes a function pre-defined as interesting. In response to determining that the execution flow includes the function pre-defined as interesting, a determination is made that the function pre-defined as interesting comprises a vulnerability of the application. In response to determining that the function pre-defined as interesting comprises a vulnerability of the application, an action is taken with respect to the vulnerability. The action can include, for example, providing information regarding the identified vulnerability and/or blocking execution of particular code of the application.

20 Claims, 8 Drawing Sheets

(56) References Cited

U.S. PATENT DOCUMENTS

| | | | |
|---|---|---|---|
| 2013/0086688 A1* | 4/2013 | Patel | G06F 21/53 |
| | | | 726/25 |
| 2013/0205397 A1 | 8/2013 | De Barros et al. | |
| 2013/0205398 A1* | 8/2013 | Kalman | G06F 21/577 |
| | | | 726/25 |
| 2013/0212435 A1 | 8/2013 | Qiu et al. | |
| 2016/0078146 A1* | 3/2016 | Simpson | G06F 16/986 |
| | | | 715/234 |
| 2017/0220805 A1 | 8/2017 | Ng et al. | |
| 2017/0255544 A1* | 9/2017 | Plate | G06F 21/577 |
| 2019/0108342 A1* | 4/2019 | Conikee | G06F 21/566 |

OTHER PUBLICATIONS

"American fuzzy lop", Retrieved From <<http://lcamtuf.coredump.cx/afl/>>, Retrieved on: Jul. 28, 2017, 6 Pages.

\* cited by examiner

POST /123-456-789/page.aspx?key1=val1&key2=val2 ← 220
Cookie: ckey1=cvar1;
― 230
bkey=bvar1&bkey2=bvar2
― 240

Void foo(string key1, key2)   ← 250₁        ← 260
{                             ← 280
  if (fooz(Request.Body["bkey1"]==1
{...}

DoSomeAction(key1);   ← 250₂
EnsureCondition(Req.Cooke["ckey1"])
}                                    ― 270

AUTOMATED FUZZING BASED ON ANALYSIS OF APPLICATION EXECUTION FLOW

BACKGROUND

Computer software application(s) and, in particular, web application(s) are prone to attack, for example, by entity(ies) external and/or internal to a host of the application(s) (e.g., hacker(s)). Computer software programs known as "fuzzers" have been developed in order to facilitate identification of potential vulnerability(ies) of application(s). Fuzzers provide request(s) comprising various input payload(s) (e.g., random, invalid, unexpected, etc.) to application(s) in order to test robustness of the application and determine which input payload(s), if any, lead to vulnerability(ies).

SUMMARY

Described herein is a system for identifying a vulnerability of an application comprising a computer comprising a processor and a memory. The memory comprises computer-executable instructions stored thereupon which, when executed by the processor, cause the computing device to: receive a message comprising a request and associated execution flow of the application in response to the request; analyze the message to determine whether the execution flow includes a function pre-defined as interesting; in response to determining that the execution flow includes the function pre-defined as interesting, determine that the function pre-defined as interesting comprises a vulnerability of the application; and in response to determining that the function pre-defined as interesting comprises the vulnerability of the application, take an action with respect to the vulnerability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to analyzing application execution flow to identify potential vulnerability(ies) of application(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Aspects of the subject disclosure pertain to the technical problem of identifying vulnerability(ies) of a software application (e.g., web application). The technical features associated with addressing this problem involve receiving an execution flow of the software application along with a request which generated the execution flow, analyzing the execution flow and request, identifying a vulnerability based upon the analyzed execution flow and request, and providing information associated with the identified vulnerability. Accordingly, aspects of these technical features exhibit technical effects of more efficiently and effectively identifying vulnerability(ies) of software application(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventionally, application(s) are scanned for security flaws by analyzing a direct (e.g., reflected error message) and/or implied (e.g., induced execution timeout) feedback. Web scanners and fuzzers are unaware of the functionality of the application under test. The scanners and/or fuzzers send payload(s) (e.g., requests) to the application under test and observe which payload(s) give a noticeable reply which is indicative of potential security vulnerability(ies). This process is prone to false positives and further runs the risk of failing to identify potential vulnerability(ies).

Figure 1:
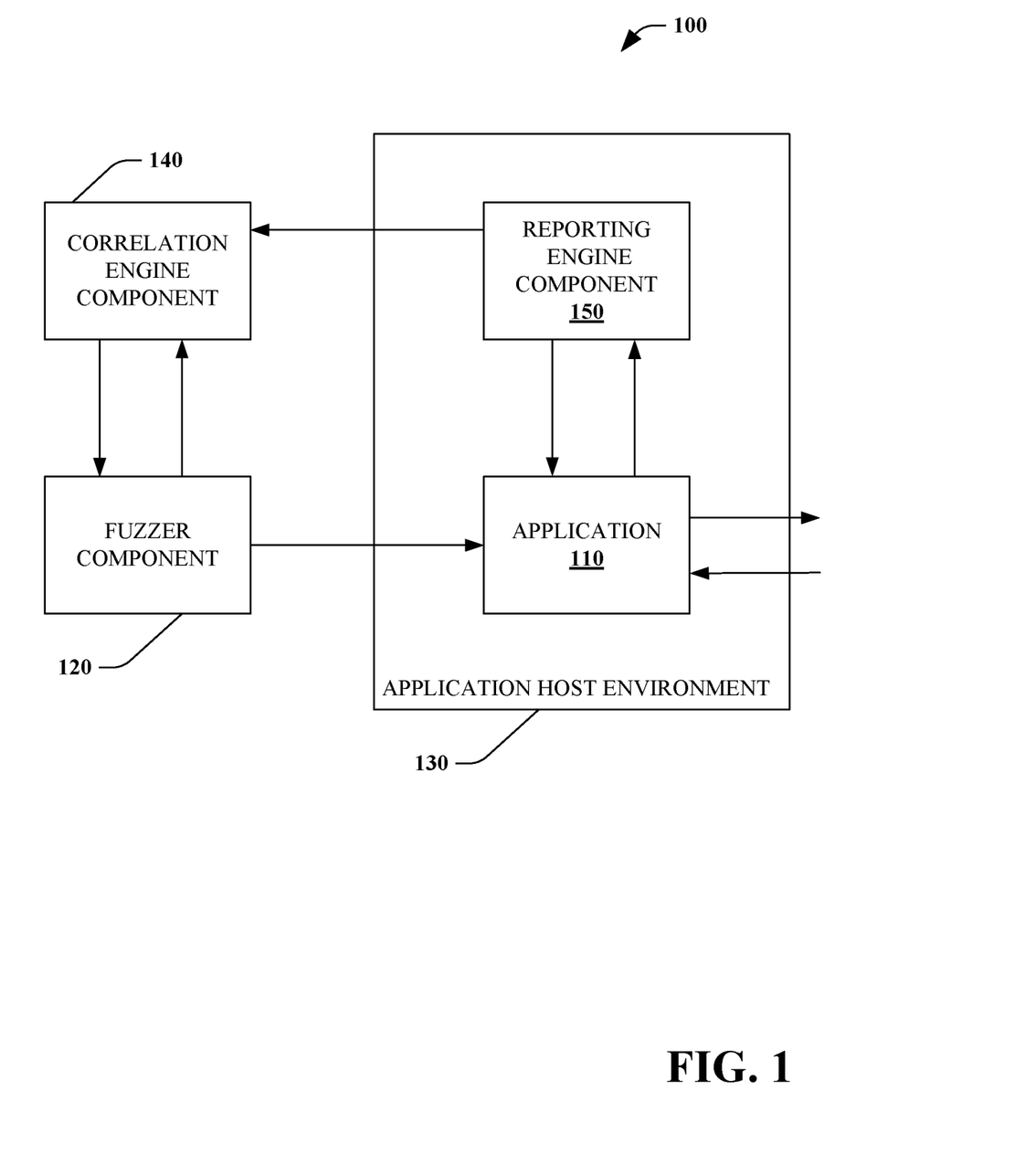
FIG. 1 is a functional block diagram that illustrates a system for identifying a vulnerability of an application.

Referring to FIG. 1, a system for identifying a vulnerability of an application 100 is illustrated. The system 100 analyzes execution flow of an application 110 (e.g., web application) to identify vulnerability(ies) of the application. Information regarding the identified vulnerability(ies) can be provided, for example, to a developer associated with the application 110. In one embodiment, the system 100 can take corrective action in order to block the identified vulnerability (e.g., temporarily or permanently). In one embodiment, by analyzing execution flow(s) and associated request(s), the system 100 can minimize sending of ineffective payload(s) during fuzzing of the application 110.

The system 100 includes a fuzzer component 120 that sends request(s) (e.g., HTTP request(s)) to an application host environment 130 in order to facilitate identification of vulnerability(ies) of the application 110 (e.g., security-related issue(s), bug(s), etc.). In one embodiment, the request(s) are generated by the fuzzer component 120, for example, including a payload comprising parameter(s) randomly selected by the fuzzer component 120. In one embodiment, the request(s) can be based upon information received from a correlation engine component 140. For example, as discussed below, in response to reviewing execution flow(s) and associated request(s), in an attempt to identify potential vulnerability(ies), the correlation engine component 140 can identify parameter(s) to be sent to the application 110. In one embodiment, the fuzzer component 120 can provide information regarding the sent request(s) and/or status of the fuzzer component 120 to the correlation engine component 140.

In one embodiment, the correlation engine component 140 can produce a snippet of code that represents execution of the application 110 in response to receipt of a particular request. In order to identify potential vulnerability(ies) of the application 110, the correlation engine component 140 can analyze the code snippet to generate additional request(s) to increase code coverage, bypass input validation and/or exploit security bug(s).

In one embodiment, the fuzzer component 120 and the correlation engine component 140 communicate via a queue. The fuzzer component 120 can retrieve fuzz request(s) sent by the correlation engine component 140 from the queue and report back to the correlation engine component 140 via the queue when request(s) have been sent to the application 110.

In one embodiment, the fuzzer component 120 can further perform crawling, for example, by filtering out tag(s) (e.g., <a href=" . . . "> tags, etc). The fuzzer component 120 can provide link(s) found during crawling to the correlation engine component 140 (e.g., through a queue, an API of the correlation engine component 140, etc.) to further facilitate identification of potential vulnerability(ies) of a particular application 110.

In one embodiment, the fuzzer component 120 can begin investigation of a particular web application 110 with a "GET/" request, and determine if there are any variable(s) (e.g., controller, API controller, etc.) that are required to be provided. Additionally, link(s) can be extracted to facilitate crawling and provided to the correlation engine component 140.

The application host environment 130 can include the application 110 and a reporting engine component 150. The reporting engine component 150 intercepts request(s) coming into the application 110. In one embodiment, the reporting engine component 150 is a module (e.g., NuGet package, JavaScript module, intermediate language weaving component, etc.) that is installed on the application 110 in the application host environment 130.

The report engine 150 monitors/logs execution flow in the application 110. In one embodiment, the execution flow of the application 110 includes a list of method(s) called, metadata, if any, associated with the method(s) called, return value(s) and hierarchy of execution of the application 110, for example:

TABLE 1

SomeController.Show(string query = "SurfaceBook13", string id = "19292")
–> string.IsNullOrEmpty( SurfaceBook13 ) => false
---> Int32.Parse("19292") => 19292

In one embodiment, the metadata includes one or more of:
Name space
Class Name
Method name
Return type
Parameters value and type (e.g., including namespace of type)
Level (e.g., whether the previous method has been finished yet)
For example, if a new method is being called, and a previous one has not been finished yet, it is often a subroutine. This can be seen as:

TABLE 2 if (statement) == false;
if (statement2) == true;
class.Method(type1 val1, type2 val2)
{
    // this means that class.Method has not been finished yet
    method2(type3 val3)
} == true;

The reporting engine component 150 provides a message to the correlation engine component 140 for use in determining action(s) for the fuzzer component 120 to take and/or identifying potential vulnerability(ies) of the application 110. In one embodiment, the message is serialized and provides the received request and execution flow (e.g., call stack) of the application 110 logged in response to the received request. In one embodiment, the message is formatted in JavaScript Object Notation (JSON). In one embodiment, the message includes an HTTP Request and information regarding one or more method(s). Each of the method(s) can have zero, one or more parameters. The message can be sent to an API endpoint of the correlation engine component 140.

In one embodiment, the received request is a raw request as provided to the application host environment 130 and intercepted by the reporting engine component 150 (e.g., obtained from the Internet Information Services (IIS) process and/or Open Web Interface process of the application host environment 130). In one embodiment, the request includes header(s), parameter(s), cookie value(s), etc. In one embodiment, for security and/or privacy preservation, sensitive data (e.g., session identifiers, JSON web token(s) (JWT), etc.) are removed from the request by the reporting engine component 150 before being forwarded to the correlation engine component 140.

The correlation engine component 140 comprises business logic that utilizes execution flow(s) and request(s) received from the reporting engine component 150 to make decision(s) on parameter(s) to send to the application 110 via the fuzzer component 120 in order to identify potential security vulnerability(ies). In one embodiment, the correlation engine component 140 can analyze the execution flow(s) and request(s) to determine parameter(s) to send to the application 110.

In one embodiment, the correlation engine component 140 can analyze execution flow(s) and request(s) to: ascertain a larger code coverage by parameter altering, bypass user input validation routine(s) and/or reach "interesting" function(s) and inject payload(s) based on potential vulnerability(ies) in the "interesting" function(s).

In one embodiment, the correlation engine component 140 can analyze execution flow(s) to drive the fuzzer component 120 in order to comply with input validation and verify if any payload(s) (e.g., parameter(s)) reach interesting functionality such as deserialization operation(s), database operation(s), file system input and/or output request(s), external query(ies), etc.

In one embodiment, identification of "interesting" function(s) is configurable by a user (e.g., developer) associated with the application hosting environment 130 and/or application 110. For example, the user can that identify file system input and/or output request(s) are "interesting" function(s), while external query(ies) are not "interesting" function(s) for a particular application 110.

In one embodiment, the correlator engine 140 can store request(s) and associated execution flow(s) and based on the code coverage, can create a minimum viable program (MVP) associated with the application 110. For example, by altering execution of the if statements of TABLE 2, above, the correlation engine component 140 can determine behavior(s) of the application 110 and reconstruct an MVP of the application 110, as discussed below.

For example, the correlation engine component 140 can submit a request with a variable having a value that satisfies a conditional statement. In doing so, the correlation engine component 140 can increase code coverage to include code execute when the conditional statement is satisfied. In this manner, the correlation engine component 140 can determine whether any interesting function(s) are invoked when code is executed in response to the conditional statement being satisfied.

In one embodiment, the stored request(s) and associated execution flow(s) can be loaded in a source code static analysis tool of the correlation engine component 140 to determine potential vulnerability(ies). For example, the correlation engine component 140 can determine that a particular HTTP request (X) executes particular functions (Y). In this manner, the functions (Y) can be loaded into the static analysis tool to determine potential vulnerability(ies).

This approach has an advantage over conventional solutions which are not aware of a particular submitted request (payload) triggering a particular "interesting" function such as an input validation mechanism. Conventional solutions generally are aware of response(s), for example, does request (X) return an error.

In one embodiment, when the correlation engine component 140 identifies that a particular payload (e.g., request and parameter combination) that triggers an interesting function, the application 110 is determined to comprise a vulnerability. The correlation engine component 140 can then provide information associated with the vulnerability, for example, to a user associated with the application hosting environment 130. For example, the correlation engine component 140 can identify the request, parameter(s) and resulting interesting function to a user (e.g., developer) associated with the application host environment 130.

In one embodiment, the correlation engine component 140 sends request(s) to the fuzzer component 120. Each request includes a unique identifier which allows the correlation engine component 140 to track request(s) (e.g., JSON web token (JWT) which holds a signed collection of data such as a request identifier and a payload branch identifier). In response to sending a request to the application host environment 130, the fuzzer component 120 can provide the request to the correlation engine component 140 and, optionally, perform additional crawling.

In one embodiment, based upon the stored execution flow(s), request(s) and determined vulnerability, the correlation engine component 140 can provide information to the reporting engine component 150 to facilitate blocking of code comprising the identified vulnerability. For example, the correlation engine 150 can instruct the reporting engine component 150 to block all request(s) to execute particular code with the exception of request(s) originating from the fuzzer component 120. In this matter, potential damaging effects of the identified vulnerability can be minimized for request(s) originating from user(s) other than the fuzzer component 120.

Once the correlation engine component 140 has been notified that a permanent repair to the application 110 has been installed, the correlation engine component 140, utilizing the fuzzer component 120, can attempt to again invoke the code which comprises the vulnerability. Once the correlation engine 150 confirms that the repair to the application 110 has remedied the identified vulnerability, the correlation engine 150 can instruct the reporting engine component 150 to return to allowing request(s) to execute the particular code.

By utilizing the execution flow in conjunction with the request, the correlation engine component 140 can optimize fuzzing of the application 110 resulting in increased identification of potential vulnerability(ies), increased code coverage and/or decreased time to identify potential vulnerability(ies).

In one embodiment, the correlation engine component 140 can bind HTTP request(s) with received execution flow(s). The correction engine 140 first receives an execution flow (e.g., function(s) invoked including parameter(s), type(s), value(s) and/or return value(s)) and an associated request (e.g., full HTTP request). The correlation engine component 140 can store the execution flow and associated request. Thereafter, the correlation engine component 140 can analyze the request to determine whether or not the request was initiated by the correlation engine component 140 (e.g., to analyze a particular code branch). The correlation engine component 140 can further determine whether or not the request has a same execution flow coverage as previous request(s). If it is determine that the request caused different execution flow coverage, the correlation engine component 140 can determine that an additional branch exists, which can be covered. Additionally, the correlation engine component 140 can detect optional variable(s), which would generate additional code coverage if utilized:

TABLE 3 void Result Action(string param1, string param2)
{
  if(param1.Equals("secret"))
    DoAction(param2);
  ...
}

Next, the correlation engine component 140 can analyze whether or not a particular constraint method (e.g., user input validation) can be solved and/or negated:

TABLE 4 if(!var.StartsWith("https://"))
var = "https://" + var;

Based upon this analysis, the correction engine 140 can detect interesting function(s) (e.g., deserialization, database operation(s), file system input and/or output request(s), external query(ies), etc.).

In one embodiment, in response to a request, an execution flow is generated by the reporting engine component 150. The correlation engine component 140 can perform a "shallow compare" of an expected execution flow and a received execution flow. "Shallow compare" means that method(s) (namespace, name), parameter(s) (name, type) and/or return type(s) are compared. In one embodiment, the correlation engine component 140 doesn't compare parameter value( ) as these may differ. For example, String.IsNullOrEmpty ("test") and String.IsNullOrEmpty("foo") is the same function shallow-wise, though the parameters are different.

In one embodiment, when performing a shallow compare, the correlation engine component 140 generates and compares a cryptographic hash (e.g., a secure hash algorithm 1 (SHA1) hash) for each of the expected execution flow and the receive execution flow. For example, the comparison can yield outcomes such as: same code coverage (or less), increased code coverage and/or different code coverage. Same code coverage (or less) refers to a situation in which the received execution flow has substantially the same code coverage (e.g., without regard to parameter value(s)) as a previously received execution flow (or it has less code coverage). In this instance, the received execution flow can be disregarded as duplicitous and the correlation engine component 140 can submit another request to the fuzzer component 120 with new value(s).

"Increased code coverage" refers to an instance in which the received execution flow went one or more steps further than a previous execution flow. In one embodiment, increased code coverage can be obtained when a condition in an if( ) statement (e.g., such as a input validation check) is changed yielding a received execution flow which is greater than a previous execution flow:

TABLE 5

Execution Flow 1: [ a ][ b ][ c ][ d ]
Execution Flow 2: [ a ][ b ][ c ][ d ][ e ]

In one embodiment, based on a determination of increased code coverage, a previous list of requests (and parameter(s)) can be deleted or moved to a lower priority. New request(s) can be created based on newly discovered execution flow parameter(s).

"Different code coverage" refers to a situation in which the received execution flow has different step(s) which are not an appendix to a previous execution flow, for example:

TABLE 6

Execution Flow 1: [ a ][ b ][ c ][ d ]
Execution Flow 2: [ a ][ b ][ c ][ x ][ y ]

In one embodiment, the correlation engine component 140 begins a new chain of request(s) for the received execution flow while continuing with request(s) associated with the previous execution flow.

As noted previously, by analyzing the execution flow(s) and associated request(s), the correlation engine component 140 can determine whether or not particular execution flow(s) include interesting function(s). In one embodiment, these function(s) are to be bound to possible vulnerability classes, and then payload(s) that would cause invocation of the particular function(s) (e.g., payload(s) to obtain from a database):

TABLE 7

| Vulnerable Function | Vulnerable Class | Payload |
|---|---|---|
| File.Open( <input> ) | LFI | ../../../ |
|  | RFI | http://... |
| Directory.Create( ) | LFI | ../../../ |
| SQLCmd.ExecuteScalar( ) | SQLI | ' or 1 = 1 -- |
|  | Stored XSS | <script>alert("xss");</script> |
| HttpClient.ReadAsync( ) | SSRF | http://... |

Since, based on the received execution flow(s), the correlation engine component 140 is aware of method name(s) and namespace(s), the correlation engine component 140 can identify potential payload(s) (e.g., parameter(s)) to be provided to the fuzzer component 120 in order to identify potential vulnerability(ies).

In one embodiment, the correlation engine component 140 can perform input validation evasion and/or checking. For example, web security can be achieved with user input validation which can be done with a number of functions, including, but not limited to:

TABLE 8

String.Equals( ), String.StartsWith( ), String.IsNullorEmpty( ),
String.EndsWith( ), String.Contains( ), ...
Regex.Match( ), Regex.IsSuccess( ), ...
Guid.TryParse( )
URI.TryParse( )

In one embodiment, by analyzing the execution flow(s), the correlation engine component 140 is aware of the presence of these function(s). The correlation engine component 140 can then generate request(s) that will cause negations (e.g., using white-listed value(s) that will pass the check) in order to increase code coverage.

In one embodiment, the correlation engine component 140 can utilize parameter tracing using a request comprising a particular HTTP parameter. The request and associated HTTP parameter can then be traced to an interesting function and/or input validation evasion. Utilizing parameter tracing, the correlation engine component 140 can determine how the HTTP parameter is utilized by the application 110 and/or whether the parameter is filtered and/or unfiltered.

An HTTP parameter (e.g., from a cookie, query string, etc.) can occur zero, one or several times in a method and/or combination of methods. For example, a particular input parameter can have a few validations being done (e.g., String.isNullorEmpty( ), x.StartsWith("https://"), x.Contains(".visualstudio.com"), etc.) before being passed to a method having "interesting function(s)" (e.g., deserialization, database operation(s), file system input and/or output request(s), external query(ies), etc.).

The correlation engine component 140 can track these parameter(s) by injecting unique parameter(s). Since the correlation engine component 140 is aware of the function(s) these parameter (s) go through (e.g., .replace( ), if-statements, casting, parsing, etc.), the correlation engine component 140 can predict validation(s) and/or alteration(s) of the parameter(s).

Figure 2:
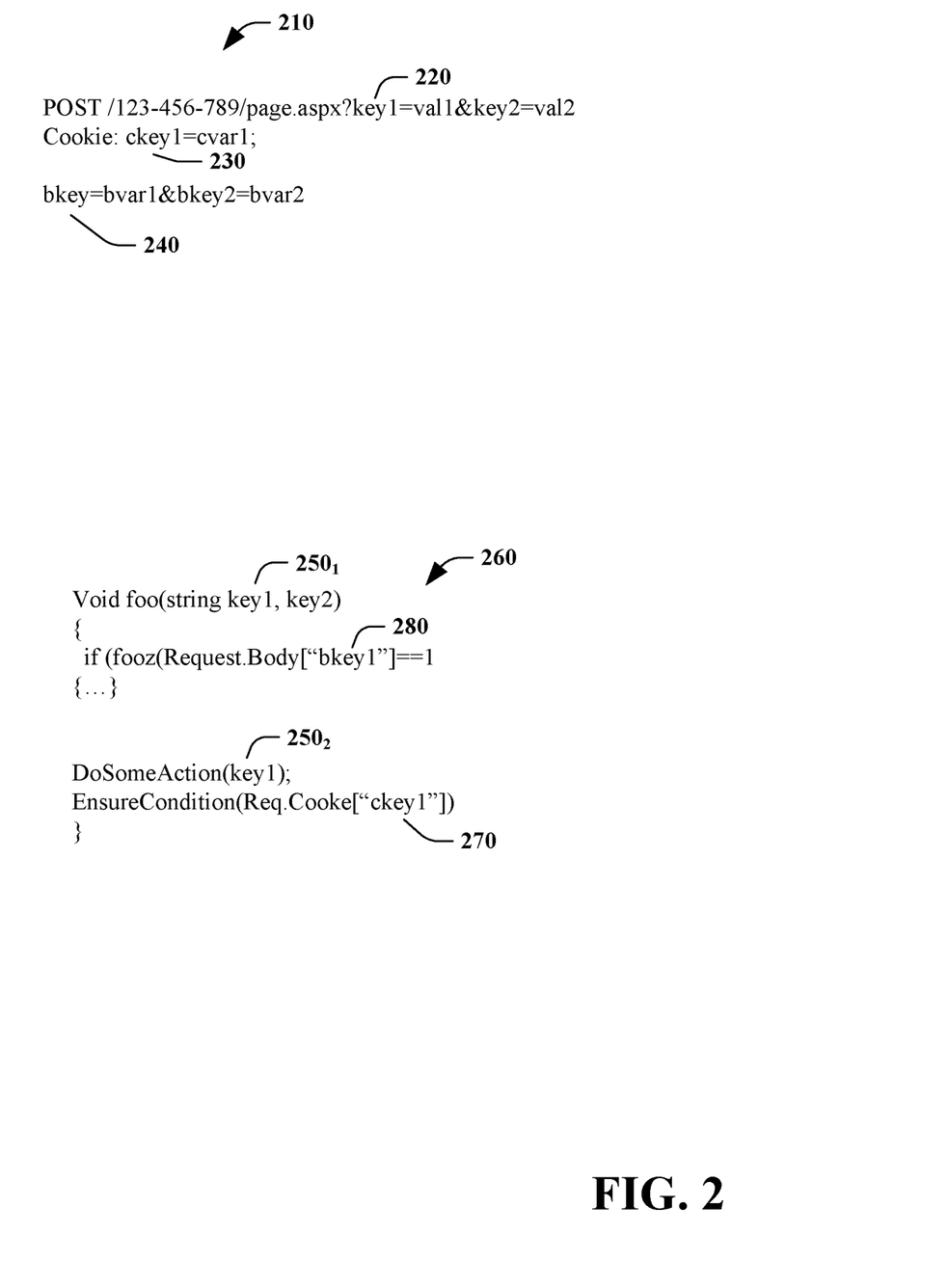
FIG. 2 is an illustration of a request and generated method.

Referring briefly to FIG. 2, in one embodiment, in order to perform parameter tracing, the correlation engine component 140 can identify/determine a link between the parameter (e.g., variable) in the HTTP Request, as well as a method of a particular application 110, for example, saved in SQL (e.g., in a list) and/or in a graph as an edge between vertices. As illustrated in FIG. 2, a request 210 comprises a first parameter 220, a second parameter 230 and a third parameter 240. Through analysis of an execution flow and the request 210, the correlation engine component 140 has determined that the first parameter 220 maps to two parameters $250_1$, $250_2$ in a method 260 of the execution flow. The correlation engine component 140 has further determined that the second parameter 230 maps to one parameter 270 in the method 260, and, the third parameter 240 maps to one parameter 280 in the method 260. Based upon these determinations, the correlation engine component 140 can generate a strategy for identifying potential vulnerability(ies), for example, to ascertain a larger code coverage by parameter altering, bypass user input validation routine(s) and/or reach "interesting" function(s) and inject payload(s) based on potential vulnerability(ies) in the "interesting" function(s).

In one embodiment, when the correlation engine component 140 determines that a particular parameter is handled by a function that indicates storage (e.g., writing a file, saving to a database, etc.), the correlation engine component 140 can store a unique value which bypasses input validation/filtering and instruct the fuzzer component 120 to filter for the particular parameter (e.g., in header(s), cookie(s), page(s), etc.). Additionally, the correlation engine component 140 can create a list of request(s) where the correlation engine component 140 can exploit cross-site scripting (XSS), header injection, etc.

In one embodiment, the execution flow comprises return type(s) and value(s) of each method. Utilizing parameter tracing, the correlation engine component 140 can actively alter request parameter(s) (e.g., cookie(s), a POST body, query string, etc.), for example, to increase code coverage.

In one embodiment, the correlation engine component 140 can have one or more application programming interface (API) endpoint(s). For example:

TABLE 9

/response : Execution flow reported.
/exception : exception found by execution flow analyzer
/links : links found by accessing application 110
/request : (accessed by fuzzer component 120) reporting request sent to application 110.

In one embodiment, each request is assigned a unique value assigned (e.g., request identifier). Further, if a list of requests is created based out of a previous request, the correlation engine component 140 can bind the request identifier of the previous request as a set identifier. When the correlation engine component 140 receives an execution flow, using the request identifier and/or set identifier, the correlation engine component 140 can first determine whether or not the request associated with the received execution flow is part of a set of requests (e.g., part of a FindEmptyArguments( ) loop). The request identifier and/or set identifier can be utilized by the correlation engine component 140 to determine whether or not greater code coverage is obtained based on the request.

In one embodiment, the correlation engine component 140 can determine whether a model-view-controller (MVC) has any arguments. For example, the execution flow can indicate which parameter(s) (e.g., name(s) and/or type(s)) are optionally allowed. For example:

TABLE 10 http://server/blah - does a particular, non-eventful action.
http://server/blah?secretmode=admin - does a different set of actions With awareness of which parameter(s) are optionally allowed, the correlation engine component 140 can send request(s) comprising the optional parameter(s). Accordingly, the correlation engine component 140 can identify potential vulnerability(ies) by increasing code coverage to include monitoring of execution of code invoked by inclusion of the optional parameter(s). The system 100 is able to dynamically identify the optional parameter(s) without static analysis or consultation of documentation regarding the application 110.

As indicated above, in one embodiment, the correlation engine component 140 can generate minimum viable code associated with the application 110 based upon analysis of request(s) and associated execution flow(s). By tracing function(s) and parameter(s), the correlation engine component 140 can create snippet(s) that represent the logic behind a request. By analyzing the change in code flow based on (e.g., intentionally) negating a known user input validation call, the correlation engine component 140 can determine which call(s) act as decision trees (e.g., such as if statement(s)).

For example, the correlation engine component 140 can receive and analyze two execution flows regarding a particular application 110:

TABLE 11

Execution Flow 1: [ a ][ b ][ c = true ][ d ]
Execution Flow 2: [ a ][ b ][ c = false ][ x ][ y ]

Based on a particular parameter, the method call c( ) returns a different value, a Boolean value. If this method call is "true", d( ) is executed. However, if c( ) returns false, then x( ) and y( ) are executed.

Based upon these execution flows, the correlation engine component 140 can generate code snippet(s) illustrated by the following pseudocode (parameters omitted):

TABLE 12 a( )
b( )
if( c( ) == true )
{
   d( );
}
else
{
   x( );
   y( );
}

In one embodiment, these code snippets are analyzed by a static code analysis tool and/or or a human analyst to identify security vulnerability(ies). In one embodiment, the correlation engine component 140 can adaptively learn (e.g., using a machine learning algorithm) from input provided by the human analyst in response to identified security vulnerability(ies) to optimize action(s) performed by the correlation engine component 140.

In one embodiment, the correlation engine component 140 and/or the fuzzer component 120 can be available to the application host environment 130 as a cloud-based service. In one embodiment, the correlation engine component 140 and the fuzzer component 120 resident on an intranet coupled to the application host environment 130.

FIGS. 3-7 illustrate exemplary methodologies relating to identifying a vulnerability of an application. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
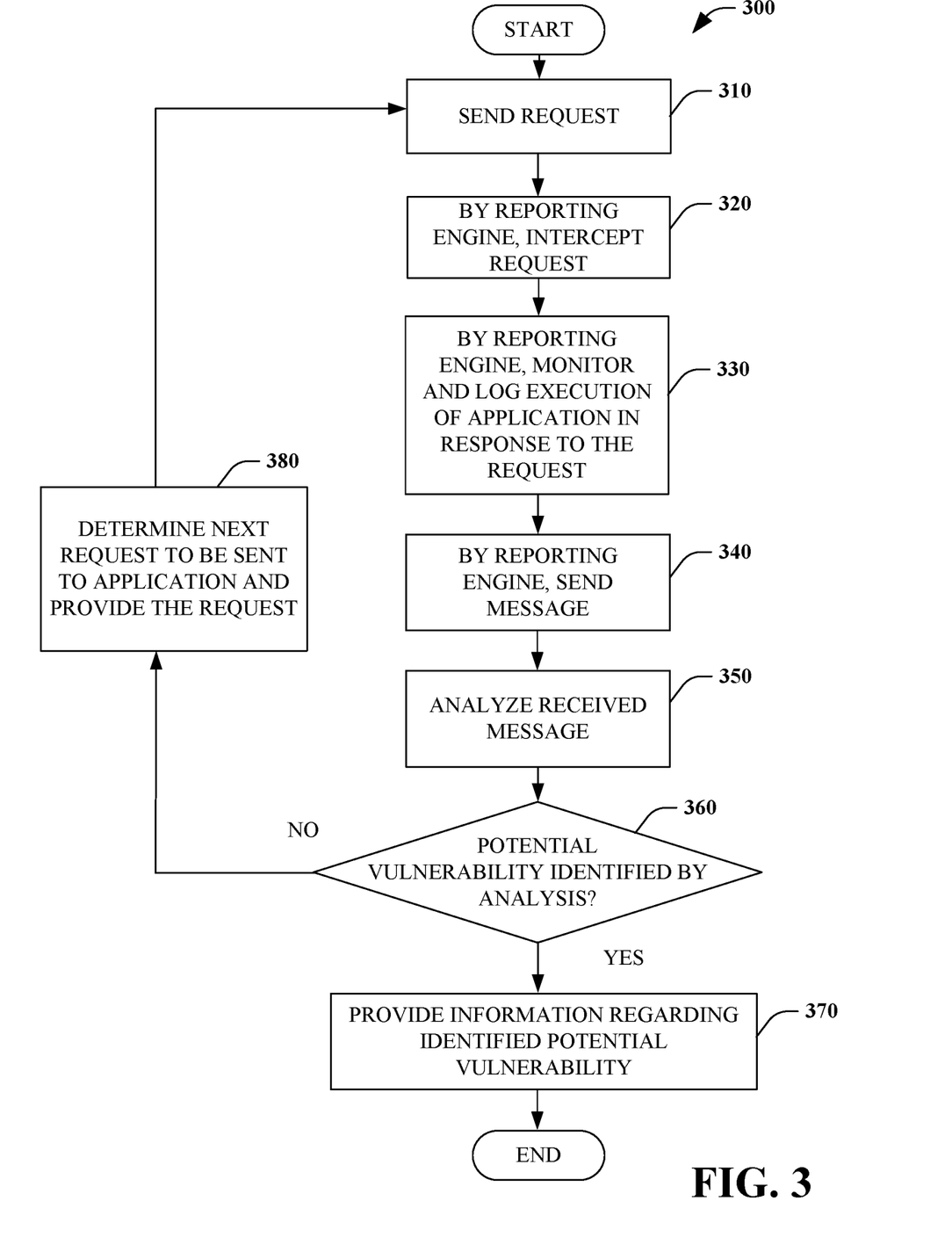
FIG. 3 illustrates a method of identifying a vulnerability of an application.

Referring to FIG. 3, a method of identifying a vulnerability of an application 300 is illustrated. At 310, a request (e.g., HTTP request) is sent, for example, by the fuzzer component 120 to the application host environment 130.

At 320, the request is intercepted, for example, by a reporting engine component 150 of the application host environment 130. At 330, execution of an application 110 in response to the request is monitored and logged, for example, by the reporting engine component 150. At 340, a message is sent (e.g., to a correlation engine component 140) by the reporting engine component 150. For example, the message can include the received request and an execution flow associated with execution of the application 110 in response to the request.

At 350, the correlation engine component 140 analyzes the received message (e.g., request and execution flow) to identify interesting functionality. At 360, a determination is made as to whether analysis of the received message has identified a potential vulnerability of the application 110. If the determination at 360 is YES, at 370, information regarding the identified potential vulnerability is provided. If the determination at 360 is NO, at 380, if additional testing of the application 110 is indicated, the correlation engine component 140 determines a next request (e.g., payload) to be sent to the application 110 and provides the request, for example, to the fuzzer component 120.

Figure 4:
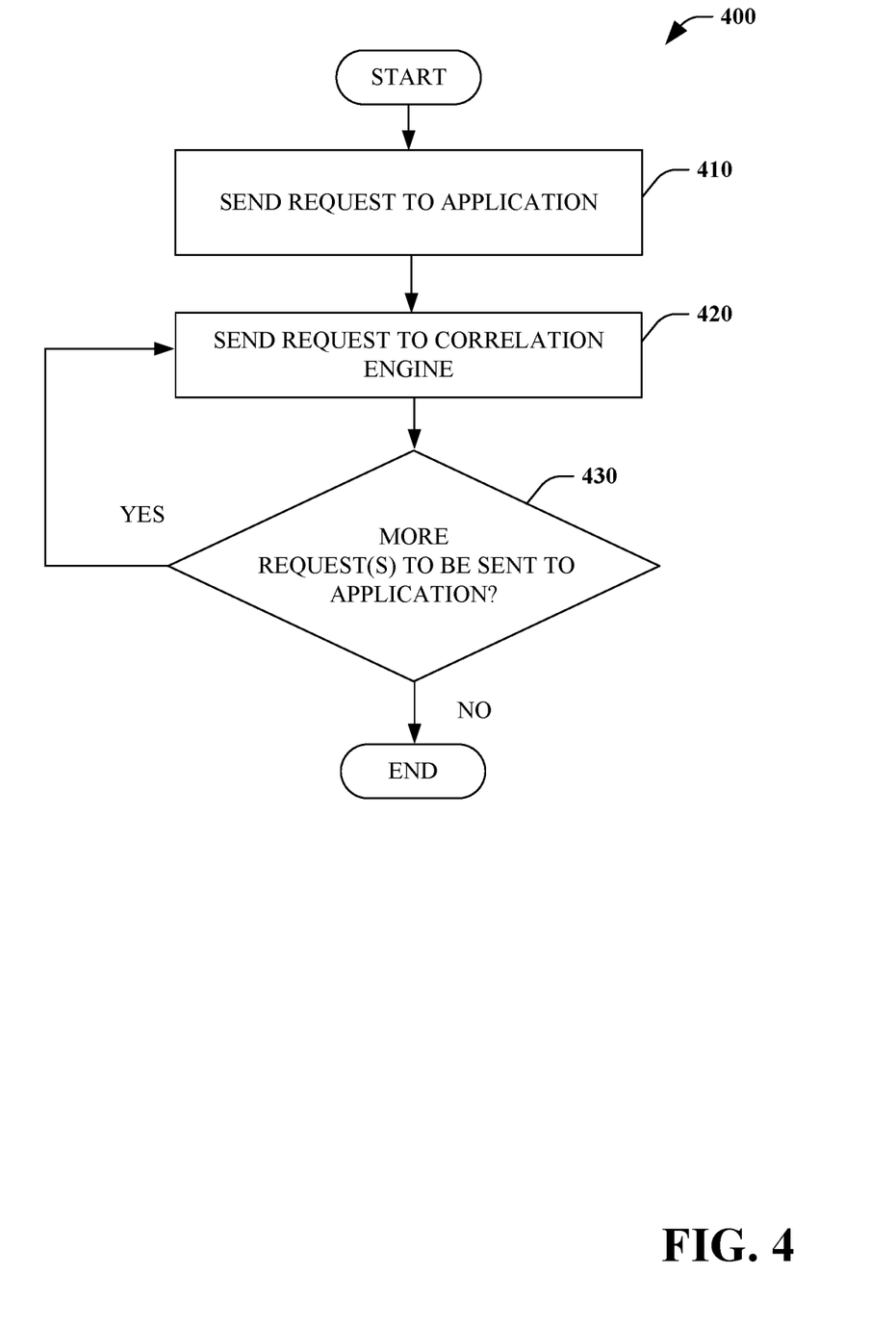
FIG. 4 illustrates a method of fuzzing an application.

Turning to FIG. 4, a method of fuzzing an application 400 is illustrated. In one embodiment, the method 400 is performed by a fuzzer component 120. At 410, a request (e.g., HTTP request) is send to an application 110. At 420, the request is sent to the correlation engine component 140. At 430, a determination is made as to whether there are more request(s) to be sent to the application 110. If the determination at 430 is NO, no further processing occurs. If the determination at 430 is YES, at 440, a next request is obtained, for example, from a queue coupled to the correlation engine component 140 and, processing continues at 410.

Figure 5:
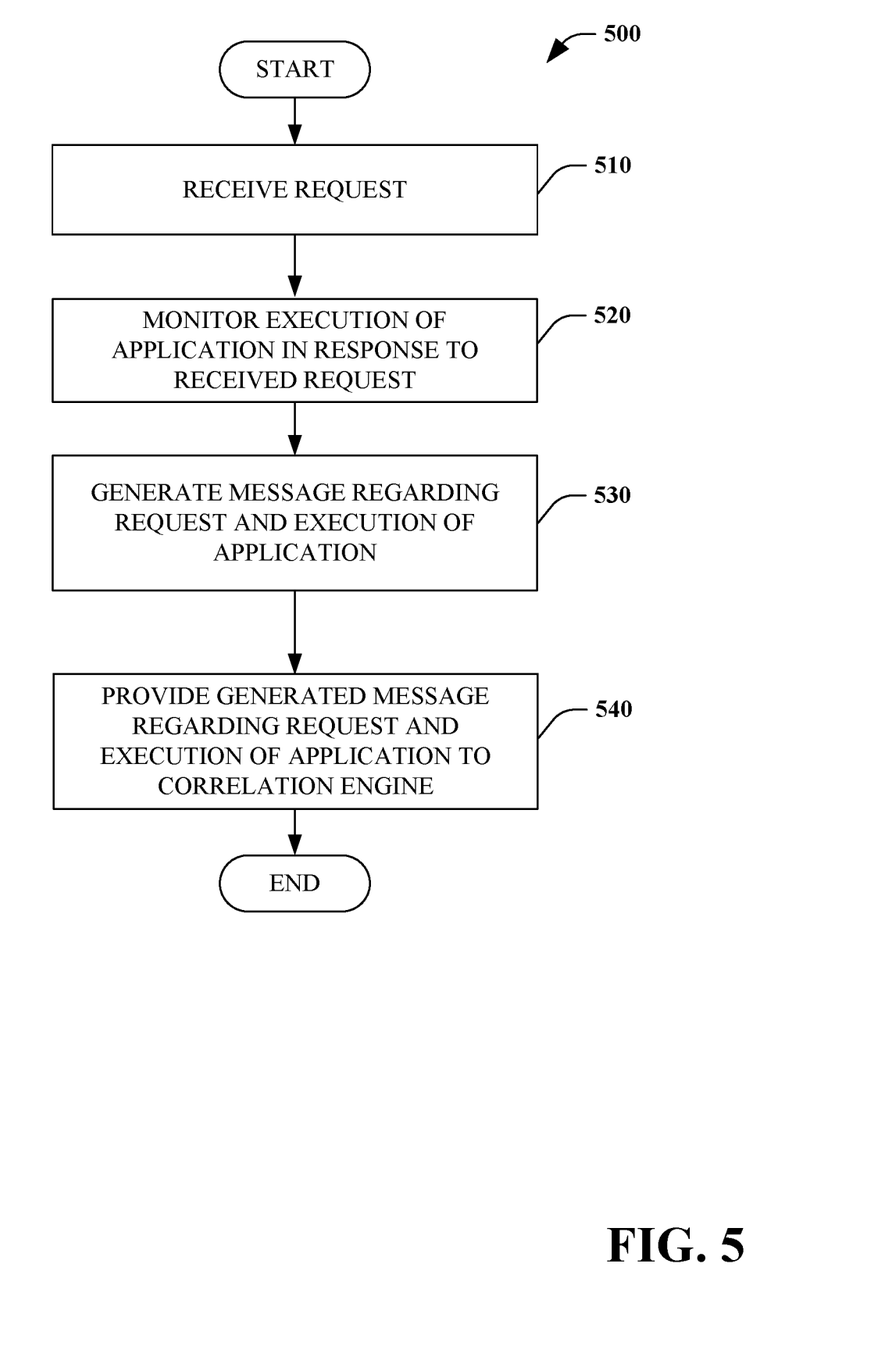
FIG. 5 illustrates a method of monitoring execution of an application.

Next, referring to FIG. 5, a method of monitoring execution of an application 500 is illustrated. In one embodiment, the method 500 is performed by the reporting engine component 150. At 510, a request is received. At 520, execution of an application 110 in response to the received request is monitored (e.g., logged). At 530, a message regarding the request and execution of the application 110 is generated. For example, the message can include the received request and an execution flow of the application 110 based on the monitoring/logging performed by the reporting engine component 150. At 540, the generated message is provided to the correlation engine component 140.

Figure 6:
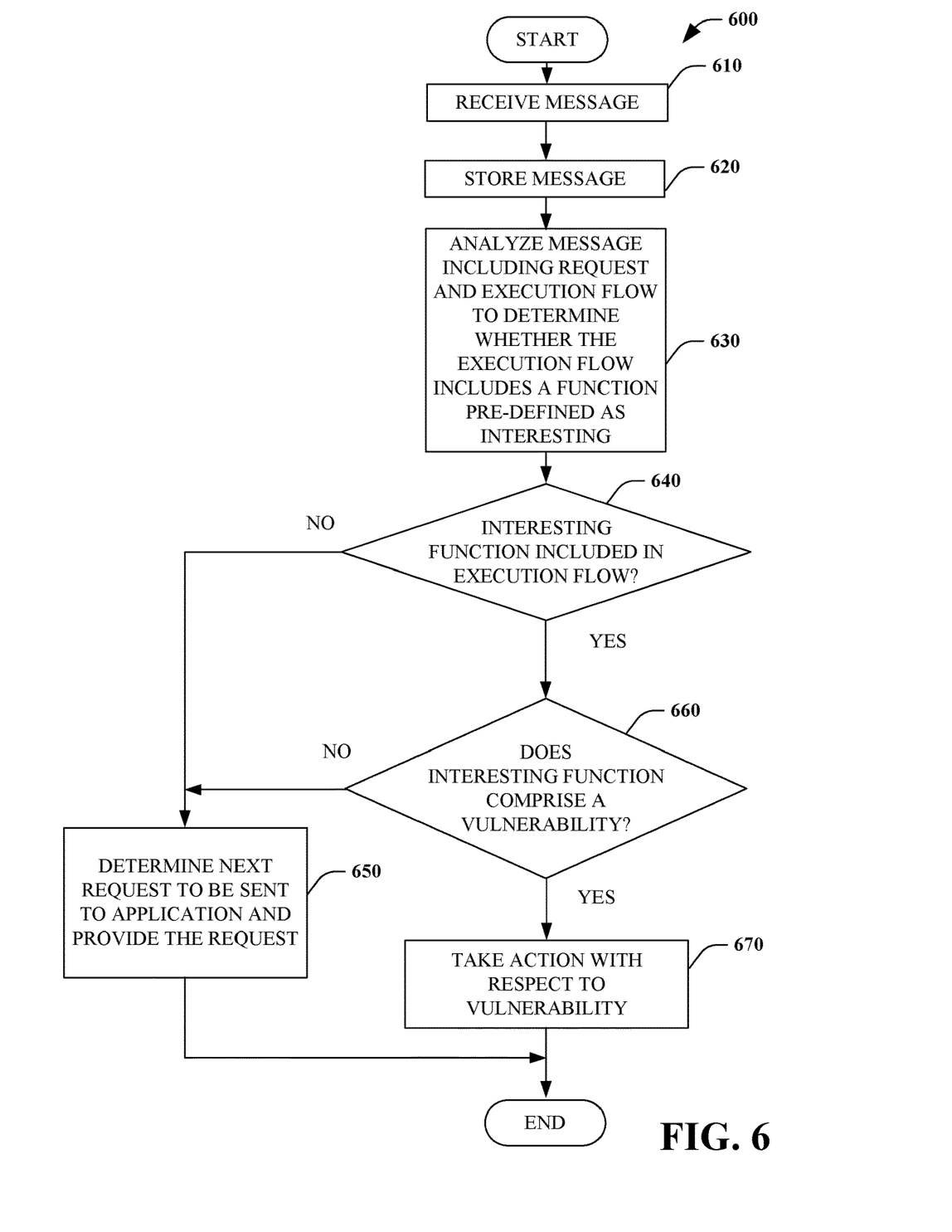
FIG. 6 illustrates a method of identifying a vulnerability of an application.

Turning to FIG. 6, a method of identifying a vulnerability of an application 600 is illustrated. In one embodiment, the method 600 is performed by the correlation engine component 140 of the system 100. At 610, a message is received, for example, from the reporting engine component 150. At 620, the message is stored.

At 630, the message is analyzed to determine whether the execution flow includes a function pre-defined as interest (e.g., an interesting function, as discussed above). For example, the message can include a request and execution flow generated by the application 110 in response to the request. In one embodiment, analysis is further based on stored message(s) (e.g., previous request(s) and associated execution flow(s)).

At 640, a determination is made as to whether the execution flow includes a function pre-defined as interesting. If the determination at 640 is NO, at 650, a next request is determined and provided, for example, to the fuzzer component 120. The next request can be determined based upon the received request and execution flow, as discussed above.

If the determination at 640 is YES, at 660, a determination is made as to whether or not the interesting function comprises a vulnerability of the application 110. If the determination at 660 is NO, processing continues at 650. If the determination at 660 is YES, at 670, an action is taken with respect to the potential vulnerability of the application 110. In one embodiment, the action includes providing information regarding the identified vulnerability, for example, to a developer associated with the application 110 and/or the application host environment 130. In one embodiment, the action includes taking corrective action in order to block the identified vulnerability (e.g., temporarily or permanently).

Figure 7:
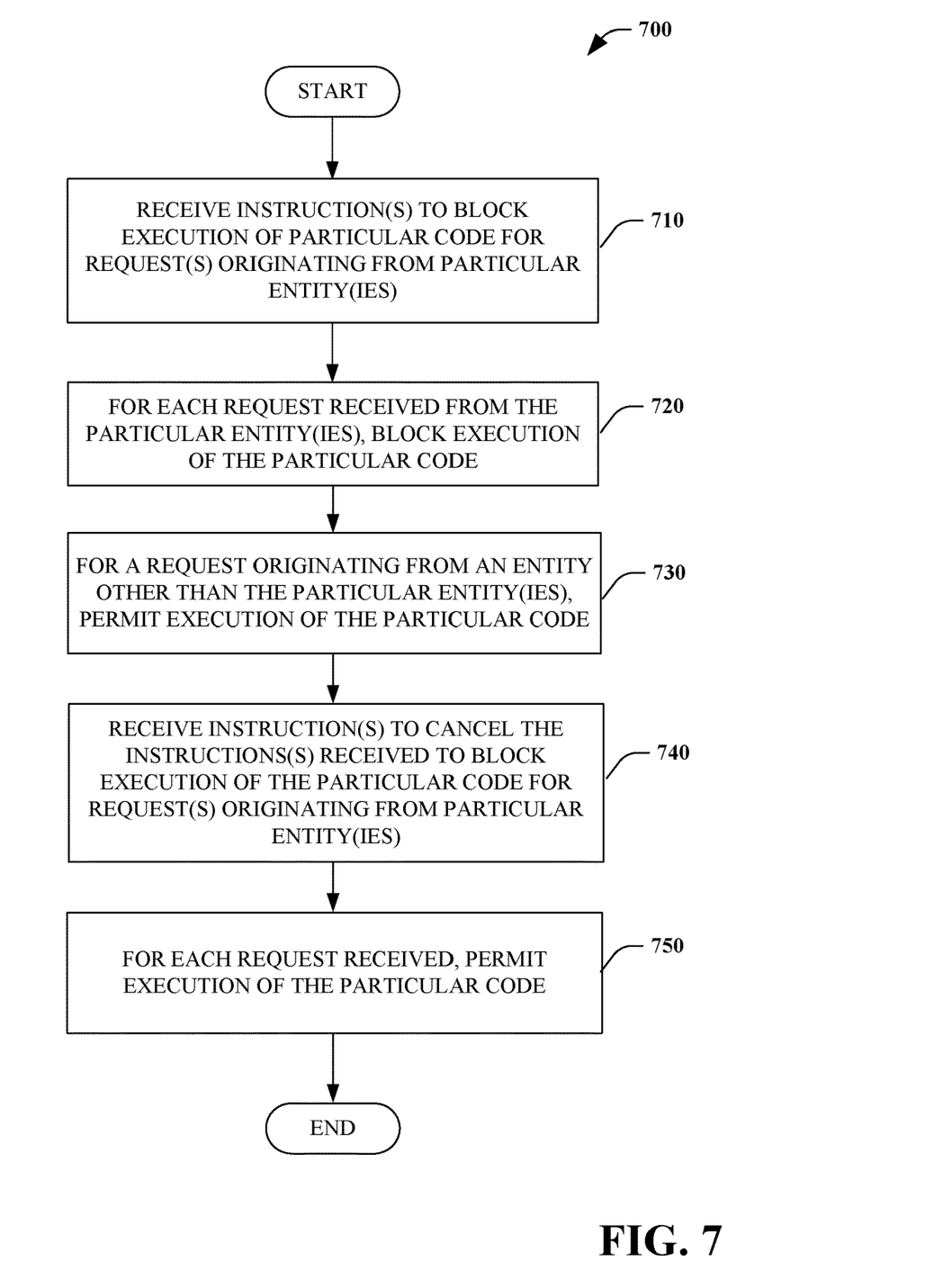
FIG. 7 illustrates a method of temporarily blocking code.

Next, referring to FIG. 7, a method of temporarily blocking code 700 is illustrated. In one embodiment, the method 700 is performed by the reporting engine component 150. At 710, instruction(s) are received to block execution of particular code for request(s) originating from particular entity(ies). At 720, for each request received from the particular entity(ies), execution of the particular code is blocked. At 730, for a request originating from an entity other than the particular entity(ies), execution of the particular code is permitted. For example, request(s) originating from the fuzzer component 120 can be permitted to execute in order to perform additional testing of the application 110.

At 740, instruction(s) are received to cancel the instruction(s) received to block execution of particular code for request(s) originating from particular entity(ies). At 750, for each request received, execution of the particular code is permitted.

Described herein is a system for identifying a vulnerability of an application, comprising: a computer comprising a processor and a memory having computer-executable instructions stored thereupon which, when executed by the processor, cause the computing device to: receive a message comprising a request and associated execution flow of the application in response to the request; analyze the message to determine whether the execution flow includes a function pre-defined as interesting; in response to determining that the execution flow includes the function pre-defined as interesting, determine that the function pre-defined as interesting comprises a vulnerability of the application; and in response to determining that the function pre-defined as interesting comprises the vulnerability of the application, take an action with respect to the vulnerability. The system can include wherein the function pre-defined as interesting is configurable by a user associated with the application.

The system can further include wherein the function pre-defined as interesting comprises at least one of a deserialization operation, a database operation, a file system input request, a file system output request or an external query. The system can include wherein the action taken with respect to the vulnerability comprises providing information regarding the vulnerability to a user associated with the application. The system can further include wherein the action taken with respect to the vulnerability comprises providing an instruction to a reporting engine component associated with the application to block execution of particular code for a request from a particular entity.

The system can include wherein the action taken with respect to the vulnerability further comprises providing an instruction to the reporting engine component associated with the application to permit execution of the particular code for a request from an entity other than the particular entity. The system can further include wherein the action taken with respect to the vulnerability further comprises providing an instruction to the reporting engine component associated with the application to cancel the instruction to block execution of the particular code for the request from the particular entity. The system can include the memory having further computer-executable instructions stored thereupon which, when executed by the processor, cause the computing device to: determine a next request to be sent to the application based upon analysis of the request and associated execution flow, and, provide the request. The system can further include the memory having further computer-executable instructions stored thereupon which, when executed by the processor, cause the computing device to: determine a next request to be sent to the application based upon analysis of the request and associated execution flow and a stored previous request and stored previous execution flow.

Described herein is a method of identifying a vulnerability of an application, comprising: receiving a message comprising a request and associated execution flow of the application in response to the request; analyzing the message to determine whether the execution flow includes a function pre-defined as interesting; in response to determining that the execution flow includes the function pre-defined as interesting, determining that the function pre-defined as interesting comprises a vulnerability of the application; and in response to determining that the function pre-defined as interesting comprises the vulnerability of the application, taking an action with respect to the vulnerability. The method can further include wherein the function pre-defined as interesting is configurable by a user associated with the application.

The method can include wherein the function pre-defined as interesting comprises at least one of a deserialization operation, a database operation, a file system input request, a file system output request or an external query. The method can further include wherein the action taken with respect to the vulnerability comprises providing information regarding the vulnerability to a user associated with the application. The method can include wherein the action taken with respect to the vulnerability comprises providing an instruction to a reporting engine component associated with the application to block execution of particular code for a request from a particular entity.

The method can further include wherein the action taken with respect to the vulnerability further comprises providing an instruction to the reporting engine component associated with the application to permit execution of the particular code for a request from an entity other than the particular entity. The method can include wherein the action taken with respect to the vulnerability further comprises providing an instruction to the reporting engine component associated with the application to cancel the instruction to block execution of the particular code for the request from the particular entity.

Described herein is a computer storage media storing computer-readable instructions that when executed cause a computing device to: receive a message comprising a request and associated execution flow of the application in response to the request; analyze the message to determine whether the execution flow includes a function pre-defined as interesting; in response to determining that the execution flow includes the function pre-defined as interesting, determine that the function pre-defined as interesting comprises a vulnerability of the application; and in response to determining that the function pre-defined as interesting comprises the vulnerability of the application, providing an instruction to a reporting engine component associated with the application to block execution of particular code for a request from a particular entity. The computer storage media can include wherein the function pre-defined as interesting comprises at least one of a deserialization operation, a database operation, a file system input request, a file system output request or an external query.

The computer storage media can store further computer-readable instructions that when executed cause a computing device to: provide an instruction to the reporting engine component associated with the application to cancel the instruction to block execution of the particular code for the request from the particular entity. The computer storage media can store further computer-readable instructions that when executed cause a computing device to: determine a next request to be sent to the application based upon analysis of the request and associated execution flow and a stored previous request and stored previous execution flow.

Figure 8:
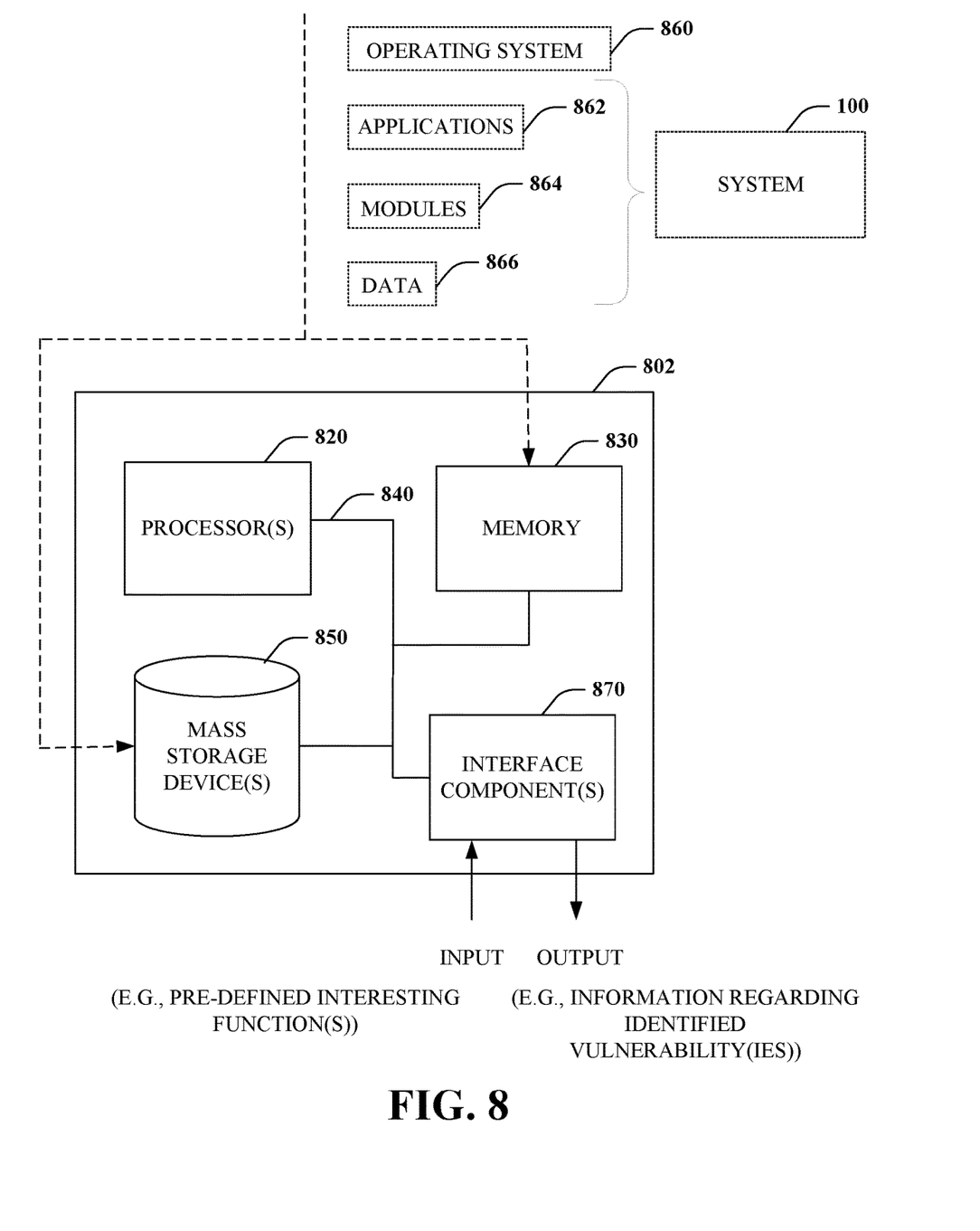
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for identifying a vulnerability of an application 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
  a processor; and
  a memory having computer-executable instructions stored thereupon which, when executed by the processor, cause the system to:
  obtain a first request and first execution flow information reflecting execution flow of an application in response to the first request;
  based at least on the first request and the first execution flow information, determine a second request to send to the application;
  obtain second execution flow information reflecting execution flow of the application in response to the second request;
  determine whether the second execution flow information identifies a pre-defined function;
  in response to determining that the second execution flow information identifies the pre-defined function, determine whether the pre-defined function comprises a vulnerability of the application; and
  in response to determining that the pre-defined function comprises the vulnerability of the application, take an action with respect to the vulnerability.

2. The system of claim 1, wherein the pre-defined function is configurable by a user associated with the application.

3. The system of claim 1, wherein the defined function comprises at least one of a deserialization operation, a database operation, a file system input request, a file system output request, or an external query.

4. The system of claim 1, wherein the action taken with respect to the vulnerability comprises providing information regarding the vulnerability to a user associated with the application.

5. The system of claim 1, wherein the action taken with respect to the vulnerability comprises providing an instruction to a reporting engine component associated with the application to block execution of particular code when requested by a particular entity.

6. The system of claim 5, wherein the action taken with respect to the vulnerability further comprises providing another instruction to the reporting engine component associated with the application to permit execution of the particular code when requested by an entity other than the particular entity.

7. The system of claim 5, wherein the action taken with respect to the vulnerability further comprises providing another instruction to the reporting engine component associated with the application to cancel the instruction to block execution of the particular code.

8. The system of claim 1, the memory having further computer-executable instructions stored thereupon which, when executed by the processor, cause the system to:
  determine a specific parameter value to include in the second request to expand code coverage of the application relative to the first request.

9. The system of claim 1, the memory having further computer-executable instructions stored thereupon which, when executed by the processor, cause the system to:
  determine a specific parameter value to include in the second request to bypass a user input validation routine of the application.

10. A method, comprising:
  obtaining a first request and first execution flow information reflecting execution flow of an application in response to the first request;
  based at least on the first request and the first execution flow information, determining a second request to send to the application;
  obtaining second execution flow information reflecting execution flow of the application in response to the second request;
  determining whether the second execution flow information indicates that the application executed a particular function;
  in response to determining that the second execution flow information indicates that the application executed the particular function, determining whether execution of the particular function comprises a vulnerability of the application; and
  in response to determining that execution of the particular function comprises the vulnerability of the application, taking an action with respect to the vulnerability.

11. The method of claim 10, wherein the particular function is pre-defined and user configurable.

12. The method of claim 10, wherein the particular function comprises at least one of a deserialization operation, a database operation, a file system input request, a file system output request, or an external query.

13. The method of claim 10, wherein the action taken with respect to the vulnerability comprises providing information regarding the vulnerability to a user associated with the application.

14. The method of claim 10, wherein the action taken with respect to the vulnerability comprises providing an instruction to a reporting engine component associated with the application to block execution of particular code when requested by a particular entity.

15. The method of claim 14, wherein the action taken with respect to the vulnerability further comprises providing another instruction to the reporting engine component associated with the application to permit execution of the particular code when requested by an entity other than the particular entity.

16. The method of claim 14, wherein the action taken with respect to the vulnerability further comprises providing another instruction to the reporting engine component associated with the application to cancel the instruction to block execution of the particular code.

17. A computer storage media storing computer-readable instructions that, when executed, cause a computing device to:
  obtain a first request and first execution flow information reflecting execution flow of an application in response to the first request;

based at least on the first request and the first execution flow information, determine a second request to send to the application;

obtain second execution flow information reflecting execution flow of the application in response to the second request;

analyze whether the second execution flow information indicates that the application executed specific code in response to the second request;

in response to determining that the second execution flow information indicates that the application executed the specific code in response to the second request, determine whether execution of the specific code comprises a vulnerability of the application; and in response to determining that execution of the specific code comprises the vulnerability of the application, provide an instruction to a reporting engine component associated with the application to block the vulnerability.

18. The computer storage media of claim 17, wherein the specific code comprises at least one of a deserialization operation, a database operation, a file system input request, a file system output request, or an external query.

19. The computer storage media of claim 17, wherein the specific code comprises a pre-defined function.

20. The computer storage media of claim 17, storing further computer-readable instructions that, when executed, cause the computing device to:

determine a specific parameter value to include in the second request to cause the application to execute the specific code.

* * * * *